Dec. 19, 1961  D. P. MARQUIS  3,013,829
BALL JOINT ASSEMBLY
Filed Sept. 17, 1959
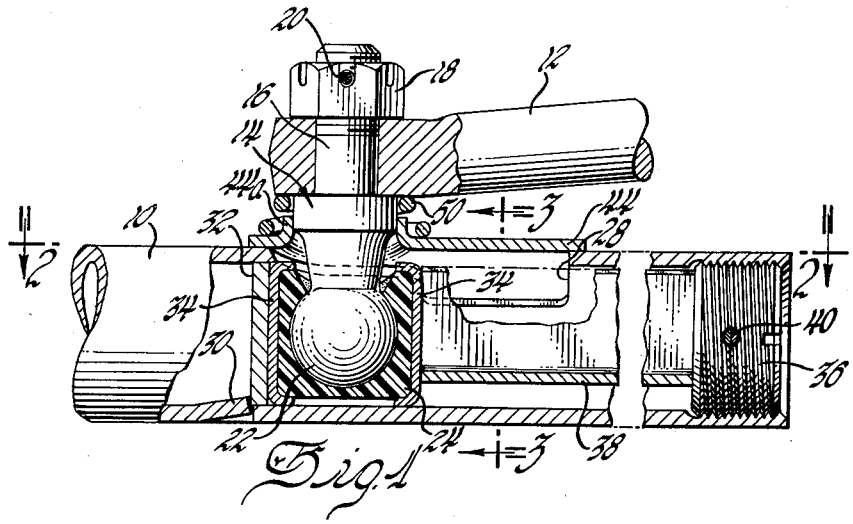
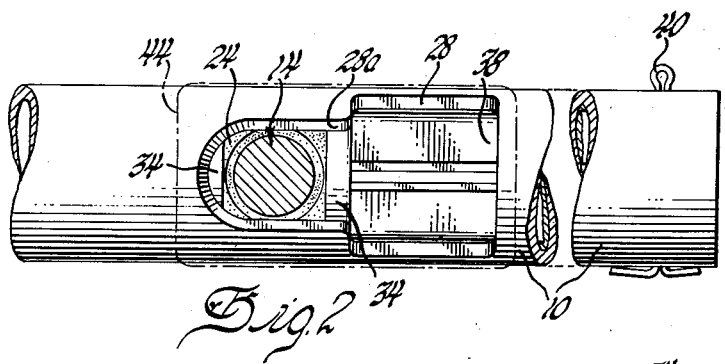
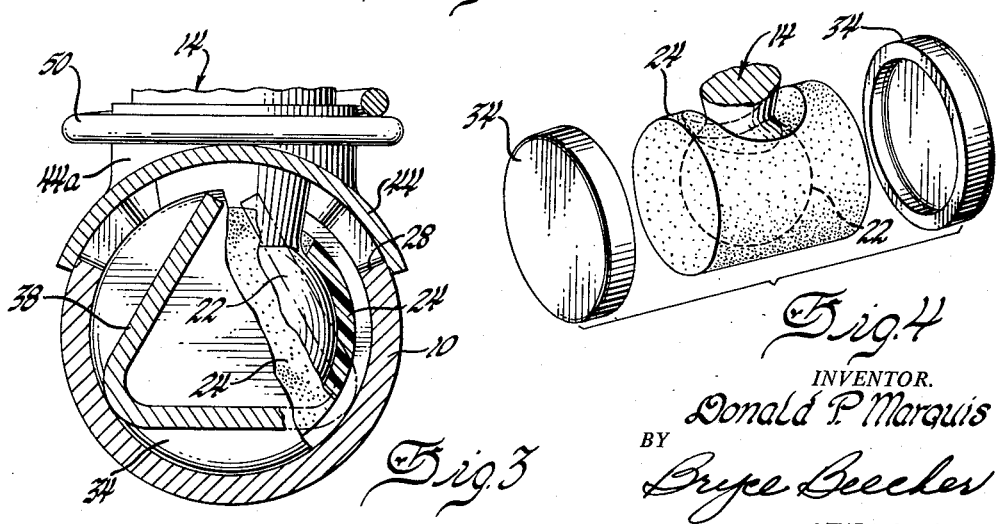
INVENTOR.
Donald P. Marquis
BY
Bryce Beecher
ATTORNEY though a slot and a hole formed in the threaded portion of the ball stud shank.

United States Patent Office 3,013,829
Patented Dec. 19, 1961

3,013,829
BALL JOINT ASSEMBLY
Donald P. Marquis, Saginaw, Mich., assignor to General Motors Corporation, Detroit, Mich., a corporation of Delaware
Filed Sept. 17, 1959, Ser. No. 840,710
2 Claims. (Cl. 287—90)

This invention relates to a ball joint construction particularly adapted for use in steering linkages. The joint is of the general type referred to as "greaseless" or "permanently lubricated."

Joints of the category indicated are becoming of increasing interest in the automotive field, where the trend is toward the elimination of connections requiring periodic lubrication. Adoption of these joints, however, has been slow because of cost and assembly problems.

The present invention aims to provide a greaseless joint of simple design, comprised of readily fabricated parts, which can be assembled by a procedure quickly consummated and requiring minimal skill.

Other objects and features of the invention will be apparent from the following description and the accompanying drawings showing a preferred embodiment. In the drawings:

FIGURE 1 is a view partly in elevation and partly in section, with parts shown broken away;

FIGURE 2 is a view on the line 2—2 in FIGURE 1;

FIGURE 3 is a section on the line 3—3 in FIGURE 1; and

FIGURE 4 is an exploded view showing parts comprised in a bushing assembly forming part of the joint.

Referring first to FIGURE 1, the numeral 10 denotes a tubular shaft which may be considered the relay rod component of a steering linkage, also comprising a tie rod 12. The latter carries a ball stud 14, the shank 16 of which extends through an eye in the end of the tie rod. A nut 18 is threaded on the shank of the ball stud to secure the same to the rod, loosening of the nut being prevented by a cotter pin 20 extending through a slot in the nut and a hole formed in the threaded portion of the ball stud shank.

The ball end 22 of the ball stud is surrounded within the tube 10 by a plastic bushing 24 which may be of phenolic composition, for example. This bushing (FIG. 4) is cylindrical in shape and is formed by a molding operation utilizing the ball end 22 as a mandrel. The diameter of the cylindrical bushing is less than the width of a slot 28 in the tubular member 10. This slot has a portion 28a of lesser width, which in the completed assembly accommodates the neck of the ball stud 14.

Tube 10 at the left of the bushing assembly is punched to provide a plurality of tangs 30, only one of these being shown (FIG. 1), serving to provide abutments for a stop washer 32. Such washer lies against one of two cap pieces 34 which engage the opposed ends of the cylindrical bushing 24. These cap pieces have a diameter greater than that of the previously mentioned slot 28.

A plug 36 threaded into the right end of the tubular member 10 retains a spacer 38 of triangular cross section (FIG. 3) in abutting relation to the bushing assembly as shown. Where desired, a spring may be used in lieu of the spacer to load the bushing assembly. A cotter pin 40 secures the plug 36 against loosening.

In order to prevent the entry of dirt and other foreign matter, the assembly includes a cover piece 44 which encloses the opening 28 and which comprises a collar portion 44a surrounding the neck of the ball stud 14. A spring 50 encircling the collar 44a operates to take up any lash which may exist between the parts.

To assemble the joint, stop washer 32 is first passed through the right end of the tubular member 10 to its position against the tangs 30. Next, the cap piece 34 is located, also by passing it through the right end of the tube since, as above mentioned, the cap pieces have a diameter greater than that of the width of the slot 28. Following location of the cap piece 34, the ball end of the ball stud, with the plastic bushing thereon, is passed through the slot 28 and shifted toward the cap piece 34 so that the left end of the bushing becomes embraced by the rim of the cap piece. Thereafter, the second cap piece 34 is inserted into the right end of tube 10 and forced into embracing engagement with the right end of the plastic bushing. Finally, spacer 38 is located by the plug 36.

I claim:

1. A joint between a tubular member and a member carrying a ball stud, said tubular member having a slot therein including a portion through which the shank of said ball stud extends and a relatively wider portion, said joint comprising stop means carried internally of said tubular member, a plastic bushing on the ball end of said stud within said tubular member, said bushing having a diameter less than the width of said wider portion of said slot, first and second separate cap means within said tubular member, said cap means being of greater diameter than such portion of said slot and embracing said bushing, and means within said tubular member retaining said bushing and said embracing means against said stop means.

2. A joint between a tubular member and a member carrying a ball stud, said tubular member having a slot therein including a portion through which the shank of said ball stud extends and a relatively wider portion, said joint comprising stop means carried internally of said tubular member, said stop means including a plurality of tangs formed by deforming said tube, a cylindrical plastic bushing on the ball end of said stud within said tubular member, the diameter of said bushing being less than the width of said wider portion of said slot, a cap piece embracing either end of said plastic bushing, said cap pieces each having a diameter greater than the width of said wider portion of said slot, and means within said tubular member retaining said bushing and said cap pieces against said stop means.

References Cited in the file of this patent
UNITED STATES PATENTS

| 1,916,744 | Skillman | July 4, 1933 |
| 2,215,243 | Klages | Sept. 17, 1940 |
| 2,448,851 | Wharam et al. | Sept. 7, 1948 |

FOREIGN PATENTS

| 620,266 | Great Britain | Mar. 22, 1949 |
| 145,774 | Australia | Mar. 17, 1952 |